(12) United States Patent
Lasserre et al.

(10) Patent No.: US 11,936,863 B2
(45) Date of Patent: Mar. 19, 2024

(54) POOLS OF TRANSFORMS FOR LOCAL SELECTION OF A SET OF TRANSFORMS IN VIDEO CODING

(71) Applicant: INTERDIGITAL MADISON PATENT HOLDINGS, SAS, Paris (FR)

(72) Inventors: Sebastien Lasserre, Thorigne Fouillard (FR); Saurabh Puri, Rennes (FR); Patrick Le Callet, Nantes (FR)

( * ) Notice: Subject to any disclaimer, the term of this patent is extended or adjusted under 35 U.S.C. 154(b) by 0 days.

(21) Appl. No.: 16/642,554

(22) PCT Filed: Aug. 31, 2018

(86) PCT No.: PCT/US2018/049006
§ 371 (c)(1),
(2) Date: Feb. 27, 2020

(87) PCT Pub. No.: WO2019/046671
PCT Pub. Date: Mar. 7, 2019

(65) Prior Publication Data
US 2021/0084300 A1    Mar. 18, 2021

(30) Foreign Application Priority Data

Aug. 31, 2017 (EP) .................................. 17306121

(51) Int. Cl.
*H04N 11/02* (2006.01)
*G06N 20/00* (2019.01)
(Continued)

(52) U.S. Cl.
CPC ............. *H04N 19/12* (2014.11); *G06N 20/00* (2019.01); *H04N 19/176* (2014.11); *H04N 19/1883* (2014.11); *H04N 19/60* (2014.11)

(58) Field of Classification Search
CPC ...................................................... H04N 19/12
(Continued)

(56) References Cited

U.S. PATENT DOCUMENTS

| 6,640,015 B1 * | 10/2003 | Lafruit | H04N 19/42 |
| | | | 708/401 |
| 6,795,504 B1 * | 9/2004 | Xu | H04N 19/61 |
| | | | 375/E7.032 |

(Continued)

FOREIGN PATENT DOCUMENTS

| CN | 102474607 A | 5/2012 |
| CN | 102763410 A | 10/2012 |

(Continued)

OTHER PUBLICATIONS

Ankur et al. On Secondary Transforms for Scalable Video Coding, 2013 Visual Communications and Image Processing (VCIP), IEEE, Nov. 17, 2013, pp. 1-6.

(Continued)

*Primary Examiner* — Leron Beck
(74) *Attorney, Agent, or Firm* — Jamie T. Nguyen

(57) ABSTRACT

A method and apparatus for improving the performance of video encoders and decoders involves selecting a set of transforms from among a plurality of sets of transforms that can be used for coding blocks in a region of a video image. Within a region, selection of a particular transform from among a plurality of transforms comprising the selected set of transforms is used to encoder or decode at least one block in the region. Associated indices representing the set of transforms to be used within a region and the selected transform for a block can be sent in a bitstream. In an alternate embodiment, a default set of transforms is complemented by selection of an additional set of transforms on a block or region basis.

20 Claims, 12 Drawing Sheets

(51) Int. Cl.
*H04N 19/12* (2014.01)
*H04N 19/169* (2014.01)
*H04N 19/176* (2014.01)
*H04N 19/60* (2014.01)

(58) Field of Classification Search
USPC ........................................ 375/240.01–240.29
See application file for complete search history.

(56) References Cited

U.S. PATENT DOCUMENTS

| | | | |
|---|---|---|---|
| 9,503,734 B1* | 11/2016 | Sze | H04N 19/60 |
| 9,674,530 B1 | 6/2017 | Bultje et al. | |
| 2005/0025246 A1* | 2/2005 | Holcomb | H04N 19/70 |
| | | | 375/240.03 |
| 2005/0069212 A1* | 3/2005 | Bottreau | H04N 19/1883 |
| | | | 375/E7.041 |
| 2005/0117640 A1* | 6/2005 | Han | H04N 19/63 |
| | | | 375/240.18 |
| 2006/0008003 A1* | 1/2006 | Ji | H04N 19/62 |
| | | | 375/240.18 |
| 2007/0081593 A1* | 4/2007 | Jeong | H04N 19/615 |
| | | | 375/E7.181 |
| 2008/0253671 A1* | 10/2008 | Choi | H04N 19/172 |
| | | | 382/238 |
| 2012/0030219 A1* | 2/2012 | Xu | H04N 19/172 |
| | | | 707/754 |
| 2013/0136175 A1* | 5/2013 | Wang | H04N 19/157 |
| | | | 375/240.12 |
| 2013/0272410 A1* | 10/2013 | Seregin | H04N 19/52 |
| | | | 375/240.16 |
| 2013/0294524 A1* | 11/2013 | Van Der Auwera | H04N 19/60 |
| | | | 375/240.18 |
| 2015/0249828 A1* | 9/2015 | Rosewarne | H04N 19/60 |
| | | | 375/240.02 |
| 2016/0219290 A1* | 7/2016 | Zhao | H04N 19/136 |
| 2017/0048528 A1* | 2/2017 | Filippov | H04N 19/187 |
| 2017/0048552 A1* | 2/2017 | An | H04N 19/60 |
| 2017/0347122 A1* | 11/2017 | Chou | G06T 17/005 |
| 2018/0077426 A1* | 3/2018 | Zhang | H04N 19/157 |
| 2018/0098081 A1* | 4/2018 | Zhao | H04N 19/61 |
| 2018/0160134 A1* | 6/2018 | Zhang | H04N 19/61 |
| 2018/0176581 A1* | 6/2018 | Huang | H04N 19/176 |

FOREIGN PATENT DOCUMENTS

| | | |
|---|---|---|
| WO | WO 2010087809 A1 | 8/2010 |
| WO | WO 2012006574 A2 | 1/2012 |

OTHER PUBLICATIONS

Algorithm Description of Joint Exploration Test Model 4 (JEM4), 116, MPEG Meeting, Oct. 17, 2016-Oct. 21, 2016, Chengdu, (Motion Picture Expert Group or ISO/IEC JTC1/SC29/WG11), No. N16511, Nov. 21, 2016, p. 22-28.

Biatek, et al., Low-Complexity Adaptive Multiple Transforms for Post-HEVC Video Coding, In Picture Coding Symposium (PCS), 2016, pp. 1-5. IEEE, 2016.

Mert et al., High performance 2D transform hardware for future video coding, IEEE Transactions on Consumer Electronics 63, No. 2 (2017), pp. 117-125.

Pierrick et al., Improvement of HEVC Inter-Coding Mode Using Multiple Transforms, 2017 25th European Signal Processing Conference (EUSIPCO), EURASIP, Aug. 28, 2017, pp. 1011-1015.

Biatek et al., Adaptive Transforms for Inter-Predicted Residuals in Post-HEVC Video Coding, 2017 Data Compression Conference (DCC), Proceedings.

Batalla, Multiple transforms for video coding, PhD diss., Rennes, INSA, 2015.

Block Adaptive Selection of Multiple Core Transforms for Video Coding, 2016 Picture Coding Symposium (PCS).

Arrufat et al., "Mode-Dependent Transform Competition for HEVC", 2015 IEEE International Conference on Image Processing (ICIP), Quebec City, Canada, Sep. 27, 2015, pp. 1598-1602.

Zhao et al., "Video Coding with Rate-Distortion Optimized Transform", IEEE Transactions on Circuits and Systems for Video Technology, vol. 22, No. 1, Jan. 2012, pp. 138-151.

Zhao et al., "Enhanced Multiple Transform for Video Coding", Institute of Electrical and Electronics Engineers (IEEE), 2016 Data Compression Conference (DCC), Snowbird, Utah, Mar. 30, 2016, 10 pages.

Selesnick et al: "A Diagonally-Oriented DCT-Like 2D Block Transform", in SPIE Optical Engineering+ Applications. International Society for Optics and Photonics, 2011, p. 81 381R-81 381R.

* cited by examiner

POOLS OF TRANSFORMS FOR LOCAL SELECTION OF A SET OF TRANSFORMS IN VIDEO CODING

FIELD OF THE INVENTION

The present principles relate to video compression and more particularly to performing video coding and decoding with block transforms.

BACKGROUND OF THE INVENTION

Many attempts have been already performed to improve the transforms of block-based codecs. They can be classified into two categories.

A first category is a change of the transform itself. The most sophisticated methods use learning of the transform on real content.

A second category is putting several transforms into competition at the local level, say at a block level.

The combination of both types of transform changes has led to so-called "multiple adaptive transforms" schemes. An extra syntax may be needed to identify which of the multiple transforms is to be used by the block.

Despite the cost of the additional syntax, the local flexibility of the choice of the transform has turned out to have a positive effect on the compression scheme.

In the prior art, the balance of 1) increasing the number of transforms to better adapt to the local statistics of the content and 2) keeping the extra transform signaling syntax as low as possible has been hard to find. Of course, more transforms lead to better adaptability but to more signaling. It has been shown that adding a few adaptive transforms is beneficial in term of compression performance. However, adding many transforms can decrease the performance because the extra signaling destroys all the gain obtained from better compression of the transformed coefficients.

SUMMARY OF THE INVENTION

These and other drawbacks and disadvantages of the prior art are addressed by the present described embodiments, which are directed to a method and apparatus to improve the balance between the number of transforms and the cost of transform signaling.

According to an aspect of the described embodiments, there is provided a method for encoding a block in a video image. The method comprises selecting a set of transforms from a plurality of sets of transforms, wherein the set of transforms is associated with a first index, selecting a transform from among a plurality of transforms comprising the selected set of transforms, wherein the selected transform is associated with a second index, transforming at least a block in a region of the video image into transform coefficients using the selected transform, and encoding the transformed coefficients along with the first index and the second index into a bitstream.

According to another aspect of the described embodiments, there is provided a method for decoding a block in a video image. The method comprises decoding a video bitstream to generate a first index and a second index, selecting a set of transforms associated with the first index from a plurality of sets of transforms to be used for decoding blocks within a region of a video image, selecting a transform associated with the second index from among a plurality of transforms comprising the selected set of transforms, to use in decoding a block in the region of the video image, and inverse transforming coefficients of at least a block in the region of the video image using the selected transform.

According to another aspect of the described embodiments, there is provided an apparatus. The apparatus comprises a memory and a processor, which can be configured to perform any aspect of the aforementioned methods for encoding and decoding a block in a video image.

According to another aspect of the described embodiments, there is provided a non-transitory computer readable medium containing data content generated according to any of the encoding embodiments.

According to another aspect of the described embodiments, there is provided a signal comprising video data generated according to any of the encoding embodiments.

According to another aspect of the described embodiments, there is provided a computer program product comprising instructions which, when the program is executed by a computer, cause the computer to carry out any of the encoding embodiments.

These and other aspects, features and advantages of the present principles will become apparent from the following detailed description of exemplary embodiments, which is to be read in connection with the accompanying drawings.

DETAILED DESCRIPTION

Figure 1A:
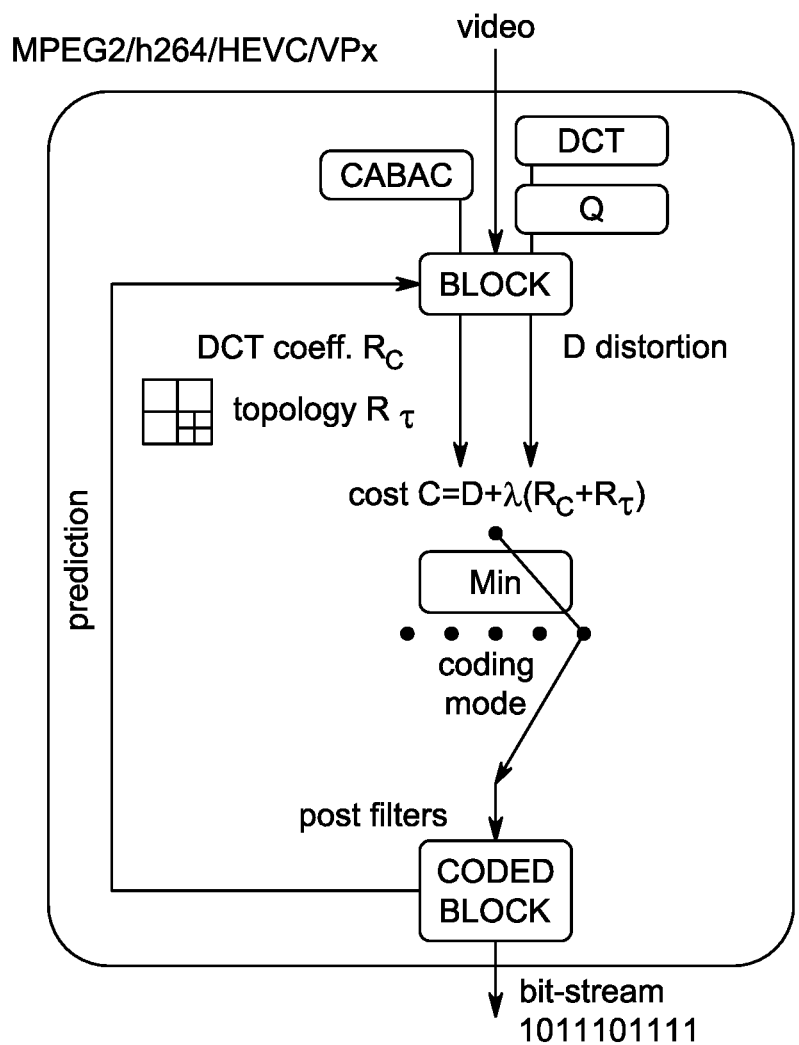
FIG. 1a illustrates general block-coding engine as used in many standard block-based codecs.
Figure 1B:
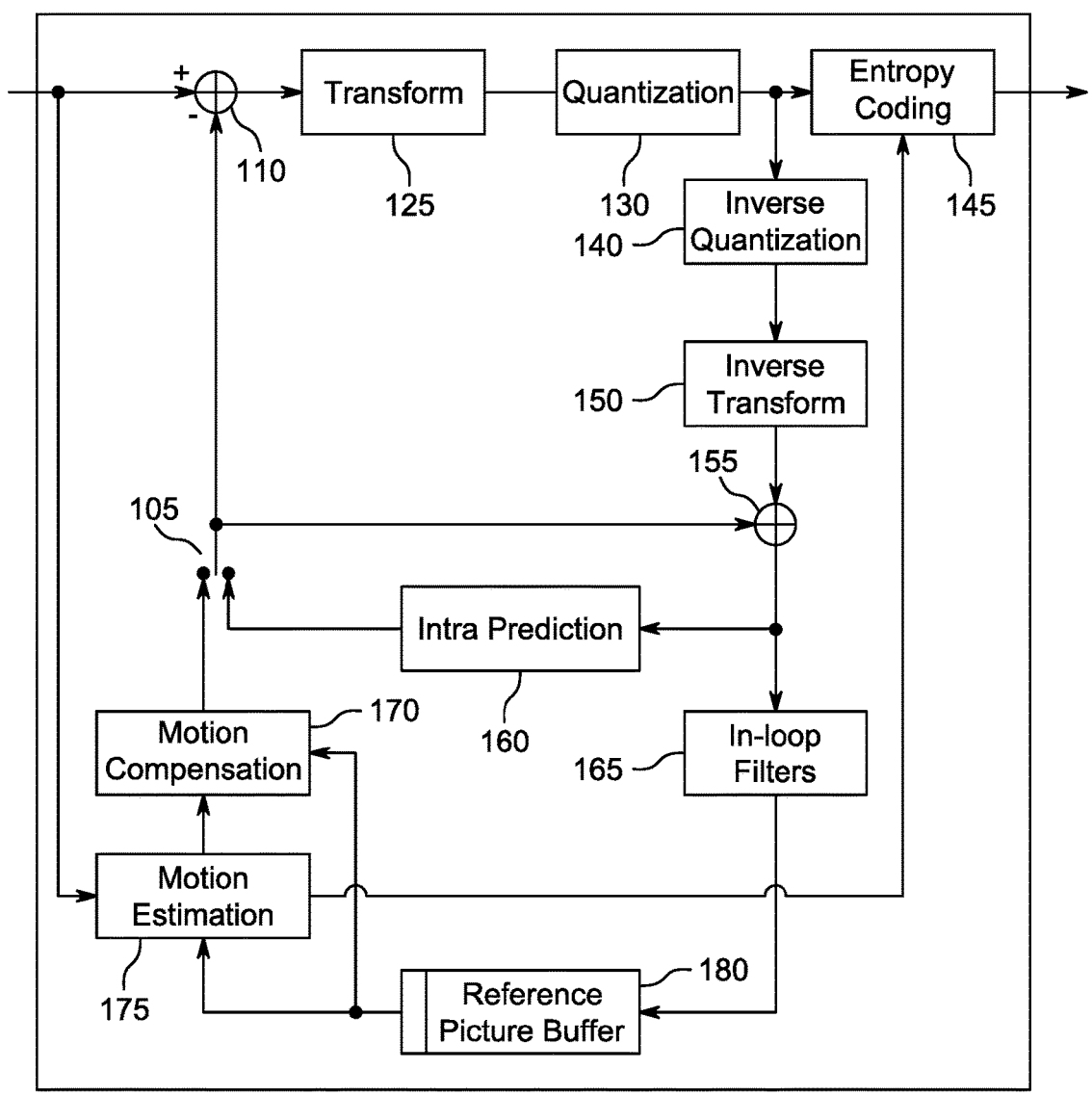
FIG. 1b shows an example HEVC coder in which the present embodiments can be implemented.
Figure 1C:
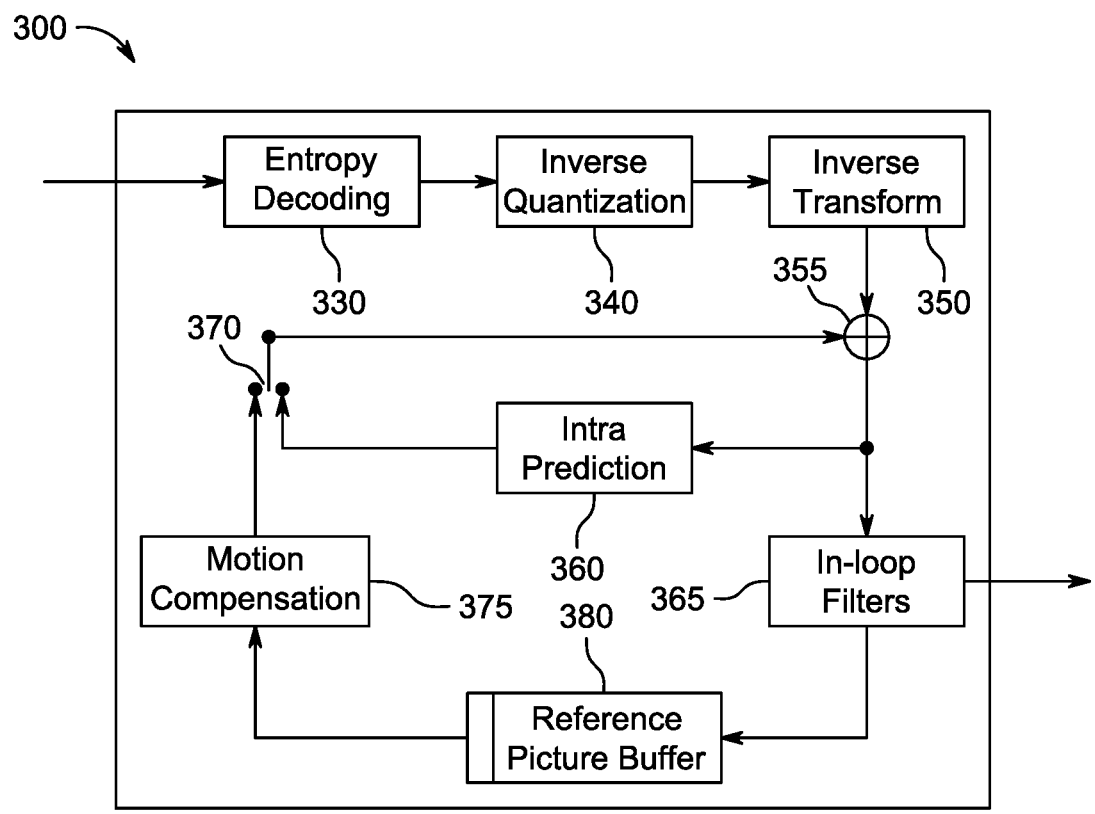
FIG. 1c shows an example HEVC decoder in which the present embodiments can be implemented.

Many block-based video and image codecs have been developed in the last decades (MPEG2, h264/AVC, HEVC, VP8, VP9, the future h266, etc.) and most of them are based on a similar block-coding engine as depicted in FIG. 1.

The technical problem solved by the following described embodiments is to improve the capability of transforms used in block-based codecs, to compact the information contained in transformed coefficients such that the compression capability of the codec is increased, i.e. the same quality for lower bit-rate.

The image is segmented in square or rectangular blocks, then a transform T (DCT, DST, etc.) is applied to the pixels of each block to obtain transformed coefficients. A quantizer Q then quantizes the coefficients to obtain quantized coefficients which are encoded by an entropy coder, such as VLC, arithmetic coder, CABAC, for example.

In order to improve the compression capability, a block can be predicted from already encoded blocks to obtain a residual. This prediction can be performed from spatially neighboring blocks (intra prediction) or a portion of a temporally different encoded frame (inter prediction). The information contained in the residual block is usually smaller than the information in the original block, thus leading to better compression performance.

The choice of
  the prediction (intra vs. inter, direction)
  the block topology (position and size, usually driven by a quad-tree or a binary tree with pruning)
is driven by a Rate Distortion Optimization (RDO) which tries to minimize the coding cost expressed as the sum $$C = D + \lambda R$$

where C is the cost, D is the distortion of the coded block compared to the original reference block, and R is the rate (=the number of bits) needed to encode the mode. Usually, the distortion D is expressed as a mean square difference between pixels and the rate R is a composite, essentially comprised of the sum of
  the rate $R_C$ needed to encode the quantized coefficients by the entropy coder
  the rate $R_\tau$ needed to encode the block topology and the prediction mode Therefore, the RDO leads to an optimal topology in term of coding cost. The parameter $\lambda$ drives the quality of the compression. For extreme values, $\lambda=0$ put all the cost on the distortion and leads to a lossless coding; on the other hand, $\lambda \gg 1$ put all the cost on the rate and leads to coding with very low bit rates. All in all, the quality, in term of distortion, of compression increases as $\lambda$ decreases.

The described embodiments focus on the improvement of the transform T to obtain better coding performance compared to other coding schemes.

The embodiments describe a new scheme and syntax for deciding which transform to be used in a block. The main approach is to split the transform signaling syntax in two levels as follows:
  select at a region level, from a pool of sets of transforms, which set of transforms to be used for this region
  decide at a local area level, from the selected set of transforms, which transform to be used for one or a group of blocks. It is understood that one region can contain several local areas.

Such an approach is advantageous because it allows maintaining the usage of many transforms to keep high adaptability to the content, while at the same time reducing the transform signaling by putting a common part of the signaling into a region level.

Figure 2:
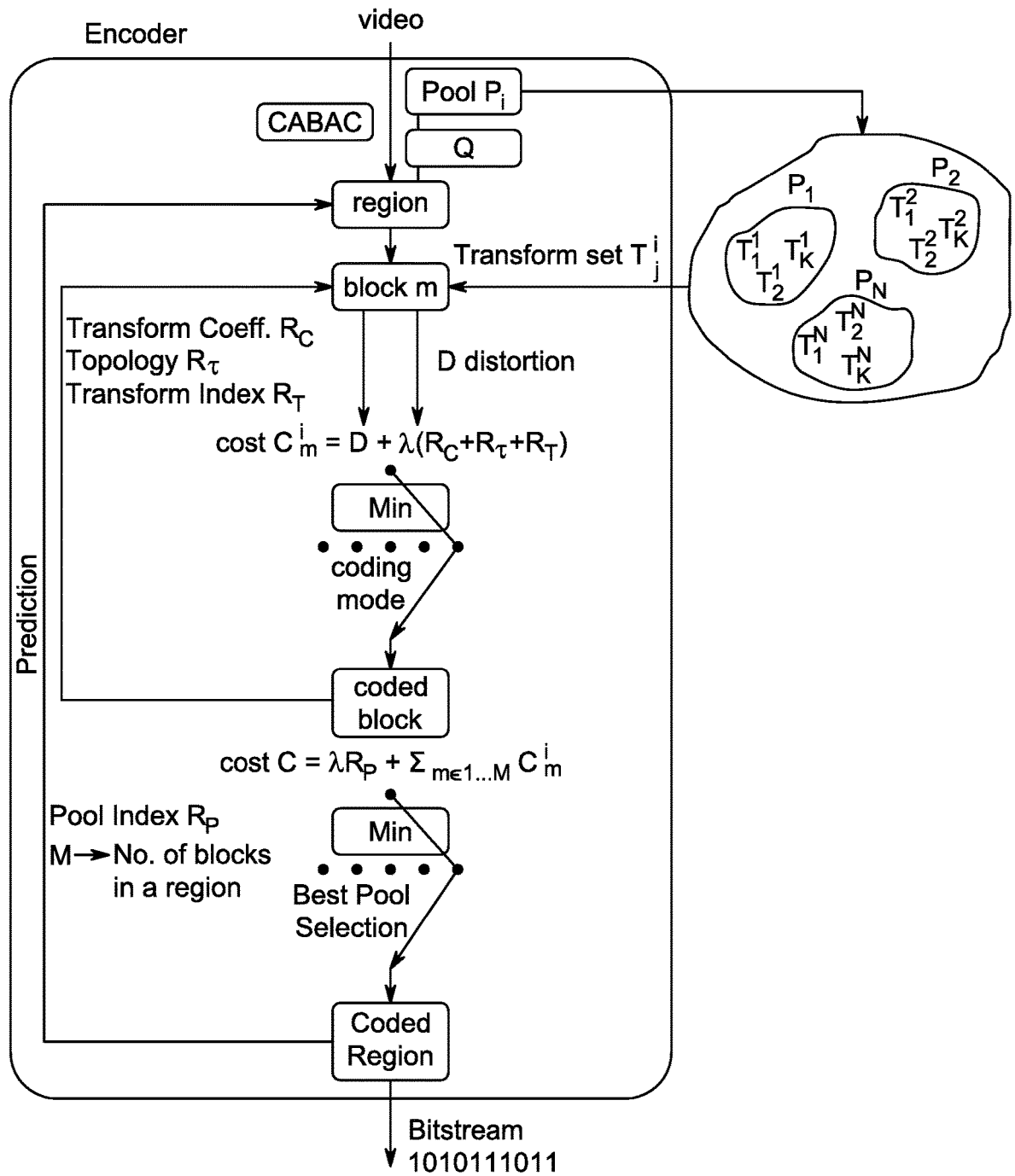
FIG. 2 illustrates a block diagram for the encoding method of the proposed embodiments, that uses a pool of sets of transforms.

One embodiment of the encoding method of the described embodiments is as depicted in FIG. 2. The choice of the transforms from the pool is performed in an RDO loop that adds a dedicated syntax to the bitstream. As shown in the block diagram in FIG. 2, a video signal is first split into regions where each region is further split into blocks or sub-regions. For a region, a first element $P_i$ (i.e. a set of transforms) is selected from the pool of sets of transforms. Then, for each block inside the region, a second element (i.e. transform from a set of transforms) $T_j^i$ is selected from the above selected first element $P_i$. This second element (transform) is then used to transform the block into coefficients. These coefficients are quantized to obtain quantized coefficients that are then coded in the bit-stream together with the index identifying the second element at decoder. The cost of encoding all the blocks inside the region is accumulated. Finally, an index identifying the first element i.e. pool index is coded in the bit-stream and the overall cost is updated.

At the region level, a set of transform $P_i$ with minimum coding cost is selected to encode that region. The coded regions can be used for predicting the next regions still to be coded in a picture.

The study of efficient transforms for image and video coding has always been an active research area. Many sophisticated approaches have been developed in the past and can be categorized into two main approaches.

One approach uses systematic transforms, i.e., already known transforms, to achieve better compression. Some recent work involves use of multiple systematic transforms obtained from the family of sinusoidal transforms, namely, DCT-II, DCT-V, DCT-VIII, DST-I, DST-VIII, for example, in an adaptive way to compress the video signal.

Figure 3:
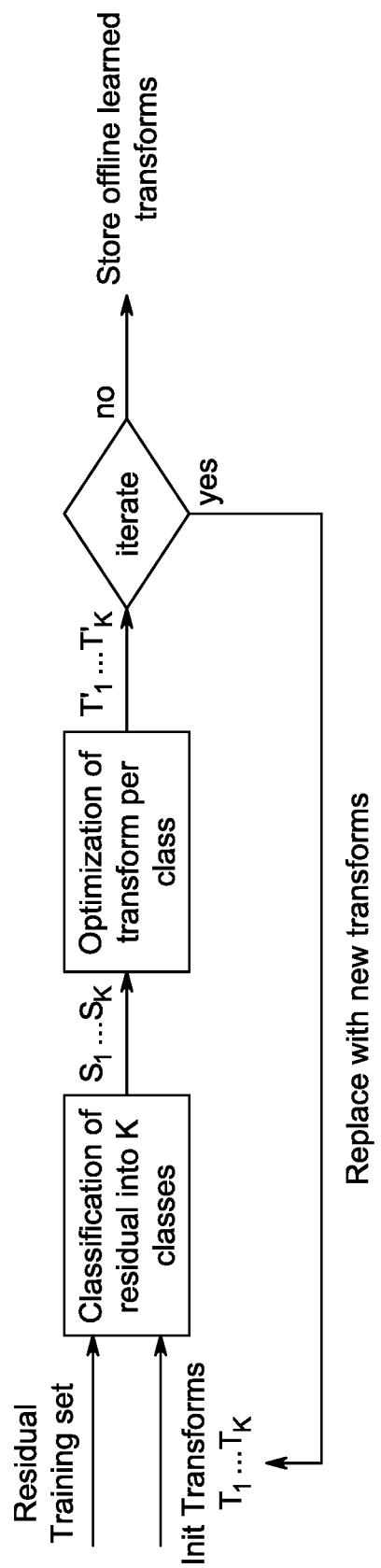
FIG. 3 illustrates a block diagram illustrating a typical offline transform learning scheme.

Another approach involves learning offline a dictionary of transforms on a large training set which is then made available on both an encoder and a decoder of a video codec. Many different learning approaches have been proposed in the literature. A typical learning scheme is shown in FIG. 3 and is described below:

Let $r^j$ (where j=1 . . . J) be the $j^{th}$ residual in a training set. Each of the residuals can be transformed using K different transforms $T_k$ (where k=1 . . . K). These transforms can either be initialized by randomly splitting the training set into K different classes and then, learning a Karhunen Loeve Transform (KLT) on each of these classes or be initialized with a set of oriented DCT-like separable transforms.

The algorithm is split into two parts: a classification of the residual blocks, and a generation of a new set of transforms. The first step classifies the residual blocks into K different classes ($S_1 \ldots S_K$) based on the equation below which shows the Rate-Distortion (R-D) cost of coding a residual block $r^j$ using a transform $T_k$ and further labels the residual with the transform index that provides minimum R-D cost.

$$R\text{-}D \text{ Cost } C_k = \|r^j - \tilde{r}^j\|^2 + \lambda \|\tilde{c}_k\|_0$$

$$\text{label } \{r\} = \underset{k}{\operatorname{argmin}} \, C_k$$

where, $\tilde{r}^j = T_k Q^{-1}(\tilde{c}_k)$ is the reconstructed residual obtained after inverse quantization $Q^{-1}$ and inverse transformation $T_k$ of the quantized coefficient block $\xi_k$.

In the second step, a new transform $T'_k$ is obtained for each class k using minimization of the reconstruction error for that class and is obtained by solving the equation below.

$$T'_k = \underset{H}{\operatorname{argmin}} \left( \sum_{j \in S_k} \|r^j - Hc_k^j\|_2^2 \right) \text{ s.t. } H^T H = I, k \in \{1, \ldots, K\}$$

Typically, Singular Value Decomposition (SVD) is used to generate an orthogonal set of transforms. The above two steps are iterated until convergence of the solution or a stop criterion is reached. As seen in the block diagram in FIG. 3, the input to the system is a training set consisting of large collections of residuals along with some initial set of transforms ($T_1 \ldots T_K$). The system outputs a set of learned transforms ($T'_1 \ldots T'_K$) after the iterative learning scheme.

Next, different methods to generate a set of transforms are briefly described. Given a training set, a set of K transforms can be generated using an offline learning scheme. However, an un-biased training set is constructed by extracting residuals from different video sequences that are diverse in terms of their content, resolution, bit-depth or other factors. Therefore, the transforms learned on this general training set are not biased towards a particular content type or resolution type and are generic.

Figure 4:
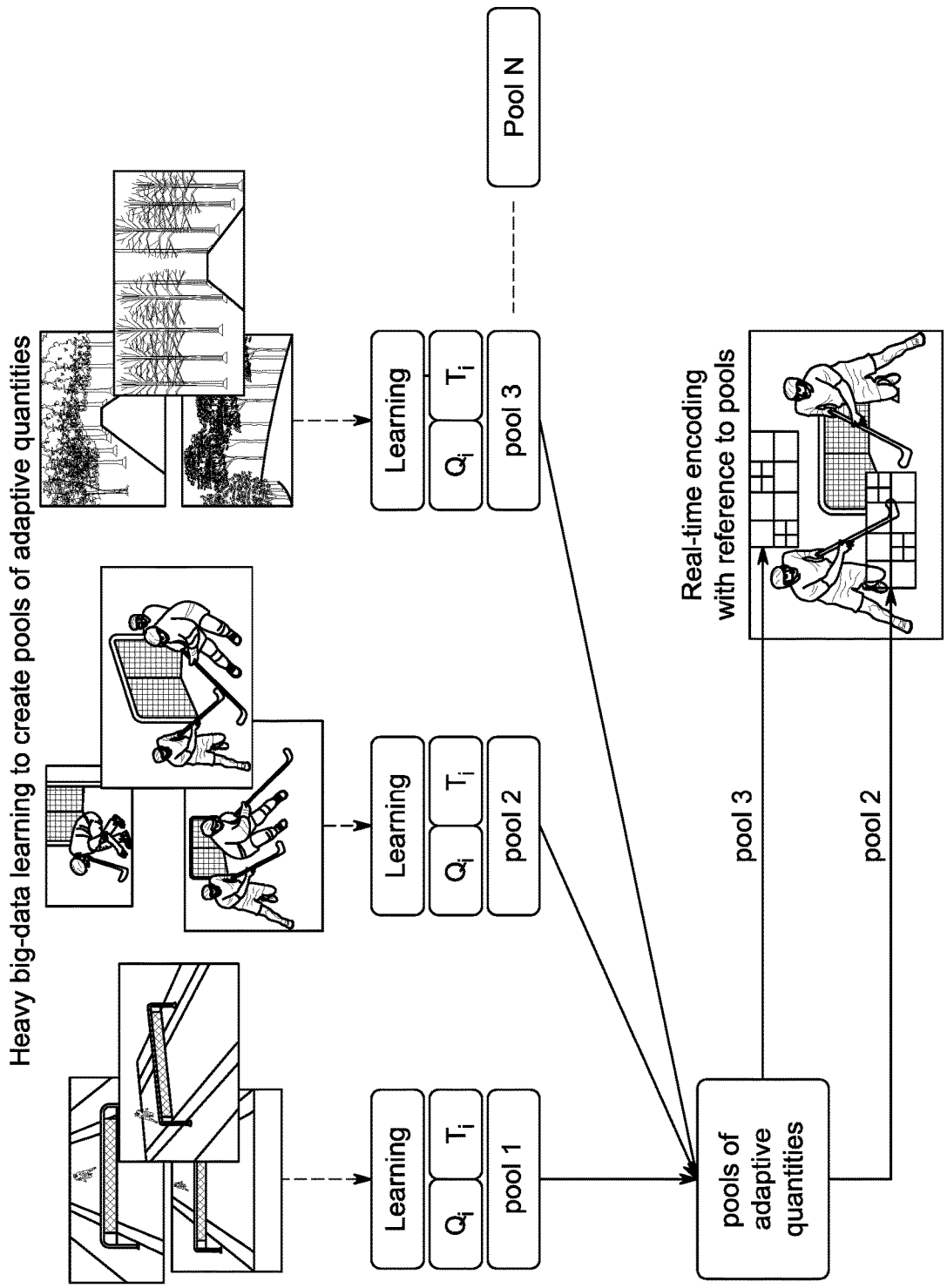
FIG. 4 illustrates one of the possible usage of adapted transforms and quantifier in real time encoding.
Figure 5:
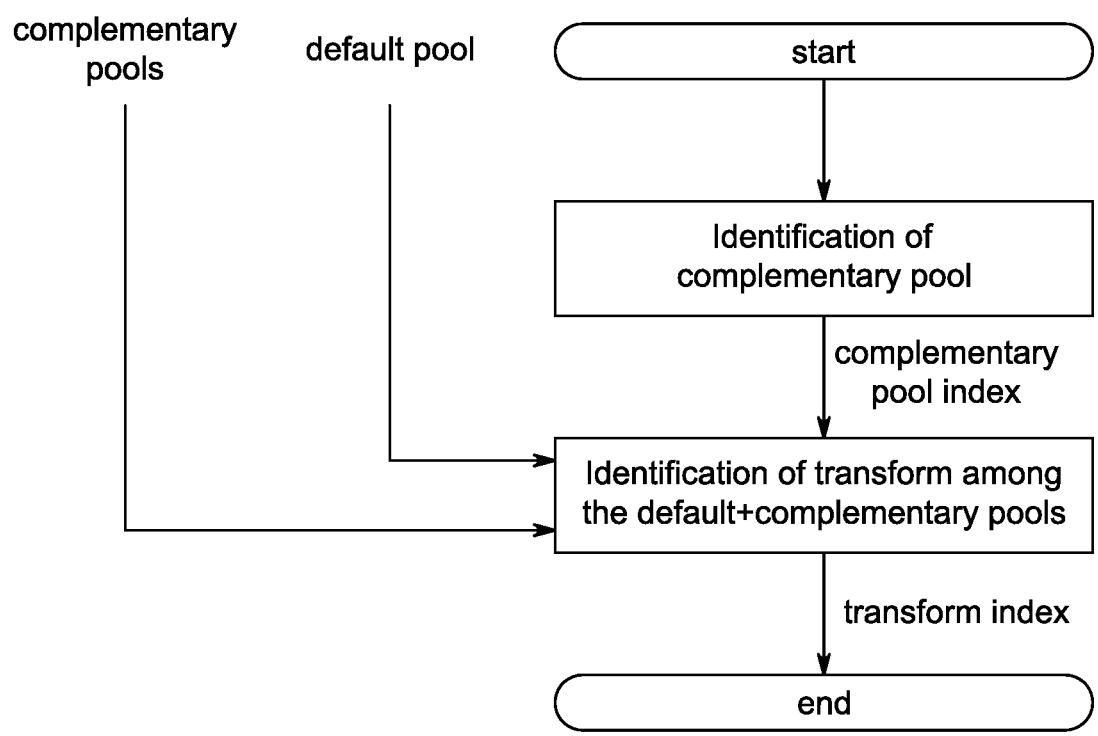
FIG. 5 shows another embodiment of a method for implementing adaptive transforms.
Figure 6:
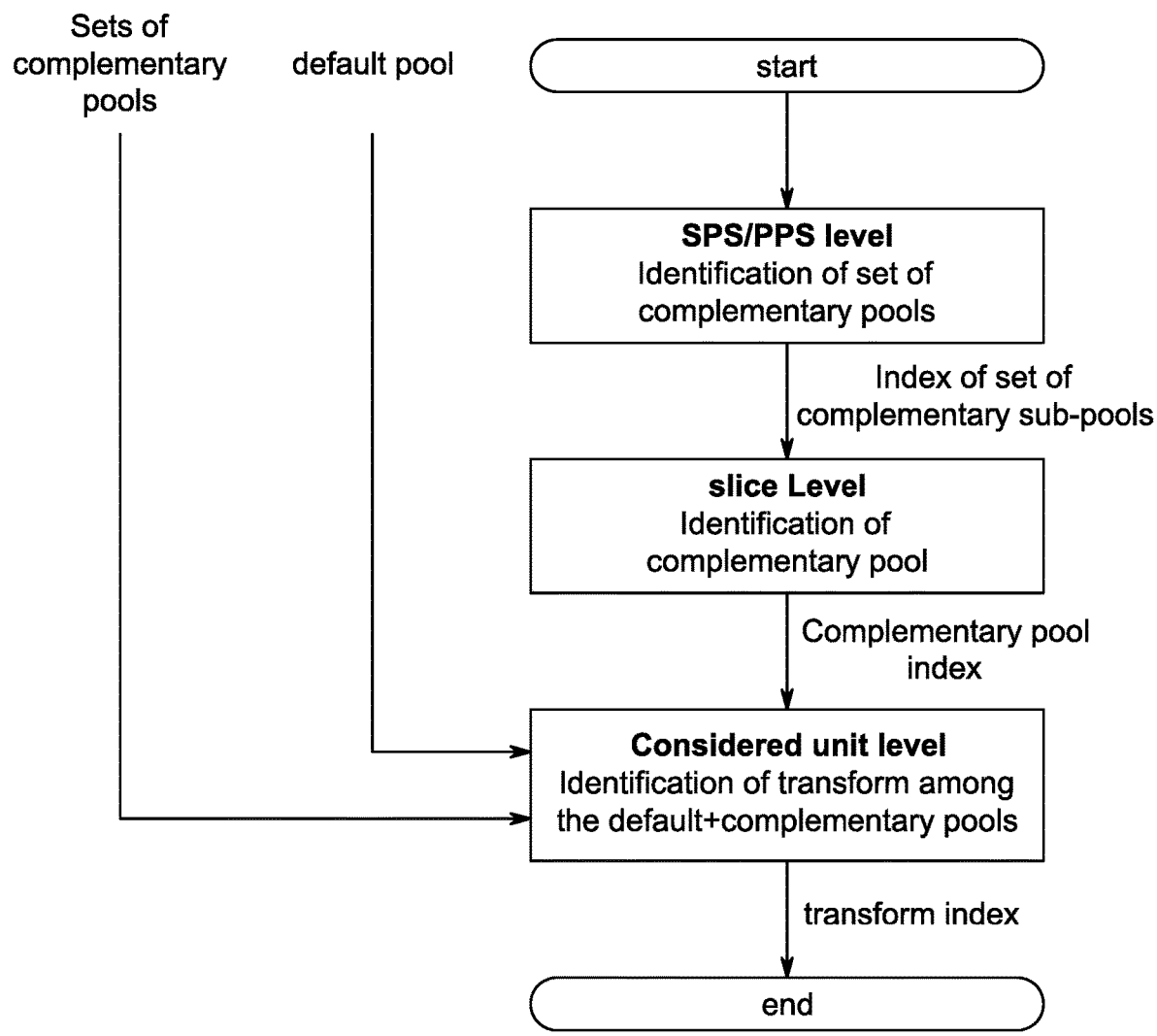
FIG. 6 shows a further embodiment of a method for implementing adaptive transforms using the described methods.

Also, another approach is to split the training set into multiple smaller training sets where the residuals in each of the training set are extracted from video sequences or images that are highly correlated to each other. An example is illustrated in FIG. 4 where a collection of sequences taken from Rolland Garros, ice hockey and a forest are taken to generate three separate training sets. Each training set is used to generate a set of transforms. These sets are finally pooled together to be used for real-time encoding.

For real-time encoding, a picture inside a video sequence is split into multiple regions where each region uses a set of transforms from a pool of more than one sets of transforms learned on different sequences. Within each region, each block, obtained through a typical tree-based splitting, is coded using a single transform from the set of transforms chosen for that region.

One may perform a brute-force test on each region by testing every set of transforms in the pool on a region and then, select the set that provides minimum R-D cost. Therefore, at region level, an index is coded to signal the choice of the set of transforms from the pool of sets of transforms. Within the region, at a more local level, such as a block or a group of blocks, for example, another index is coded to signal the choice of transform within the set that is used to code at that local level.

In an exemplary encoding embodiment, a pool of sets of transforms is computed offline using methods described in the previous sections and is made available at both encoder and decoder sides of a video codec. The following steps are performed by the encoder:

1) A video picture is split into regions which are fed to the encoder along with the pool of sets of transforms $P_i$ where $i \in [0; N-1]$ where N is the total number of sets of transforms within a pool
2) For each region,
   a. a set of transforms $P_i$ is selected from the sets of transforms.
   b. For each block (or group of blocks), obtained using tree-based splitting, within a region:
      i. a transform $T_j^i$ where $j \in [0; K_i-1]$ and $K_i$ is the number of transforms in the selected set of transforms $P_i$, is chosen from the above selected set of transforms $P_i$
      ii. for each transform and block:
         1. a prediction (intra or inter) is performed from already reconstructed samples
         2. a residual block is obtained by computing pixel-wise difference between the original block and the predicted block
         3. the residual block is transformed into coefficients using $T_j^i$
         4. the coefficients are quantized using a quantizer Q to generate quantized coefficients
         5. the bit-rate of quantized coefficients is estimated using a virtual entropy coder (like CABAC or context-free coder)
         6. the bit-rate of the index, identifying the transform used for this block, is estimated
         7. the estimated rate R, as the number of bits required to code the quantized coefficients and the index, is estimated
         8. inverse quantization and inverse transform are applied to the quantized coefficients to generate the reconstructed residual block
         9. the prediction is added to generate reconstructed block
         10. distortion D is computed as a mean square error between the original block and the reconstructed block
         11. the cost $C_m = D + \lambda R$ is estimated for coding the current block
      iii. Repeat step (i) for each transform $T_j$ within the set of transforms $P_i$ and choose the transform with minimum R-D Cost $C_m$
   c. Repeat step (b) for each block (or group of blocks) m and sum up the cost $C_m$ of coding all the blocks in a region to get cost C per region
   d. estimating the bit-rate of the index identifying the set of transforms $P_i$ in the sets of transforms used in this region.
   e. Repeat from step (2) for each set of transforms $P_i$ within sets of transforms and choose the set of transforms with minimum R-D Cost C
3) Encode the region with the determined $P_i$ and $T_j^i$ For decoding, the following steps can be performed:
1) Obtain from the bit-stream a first index identifying the set of transforms $P_i$, from the sets of transforms, for a region to be decoded
2) Within said region, for each block (or group of blocks),
   a. Decoding the quantized coefficients
   b. Decoding a second index identifying the transform $T_j^i$ in the above selected set of transforms
   c. Inverse quantizing and inverse transforming said quantized coefficients to obtain the residual block
   d. Computing the prediction block from the already reconstructed regions
   e. Adding prediction block to the residual block to generate the reconstructed block
3) Repeat (2) for each block (or group of blocks)
4) Repeat (1) for each region There are additional embodiments that can be implemented, such as a method for encoding a picture characterized in that the method comprises, for at least a first set of blocks, first, selecting an element from a superset (or group or pool) of second sets of at least two transforms. Then, selecting a transform, for at least two subsets of the first set, from the selected second set of at least two transforms and transforming at least one block, for each of the at least two subsets, into coefficients using the selected transform. Finally, encode, into at least one bitstream, at least an index identifying the selected element, indexes identifying the selected transforms, and the coefficients.

Additional embodiments can have the following characteristics. A block can be a picture block or residual block. A set of blocks, subsets of blocks are determined using trees, such as quadtrees, or binary trees. In addition, subsets of blocks can be children of the set of blocks in the tree structure. Also, as a set of transforms, the set can be defined as the largest coding unit (LCU) or equivalently as Coding Tree Unit (CTU). A subset can be defined as a Transform Unit (TU) or Coding Unit (CU) or as any child node in the tree.

In an embodiment, a default pool of transforms is defined and always activated. The default pool is then complemented by sub-pools, that can be adaptively selected. The selection can be typically made at the picture, slice, CTU, or CU level.

The simplified syntax decoding process for this embodiment is illustrated in the flow chart below. A default pool is defined and is systematically used for coding the considered unit to be coded, the unit being, for example, a CTU, a CU, or a slice. From the start of the process, a first step "identification of complementary pool" identifies the index of the complementary pool to be used for the considered unit to be coded. Then a second step identifies the index of the transform to be used among the set of transforms made of the transforms of the default pool, and of the transform of the selected complementary pool. This provides a transform index for the transform to be applied to the considered unit. The transform selection process ends after this step. This concept can be generalized to more than two levels of pools.

In another embodiment, the complementary pool is signaled at a higher syntax level, such as at the SPS or slice level, than the considered unit. For instance, the complementary pool signaling is made at the SPS level, and the transform signaling is done at the considered unit level.

The concept can also be generalized to more than two levels of pools. An example is given below. Compared to the previous embodiment, one additional step of identification of the set of complementary pools is inserted as a first step of the transform selection process. This step in this example applies at the SPS or PPS level. The second step of selecting the complementary pool among the selected set of complementary pools is done at the slice level. And the third step of selecting the transform among the default pool and a selected complementary pool is done at the considered unit level, such as the CTU or the CU level.

According to a further embodiment, a separate set of candidate pools of transforms is considered for each temporal level in the video sequence to encode.

According to a further embodiment, the set of candidate pools associated with a higher temporal level is a truncated version of the set of candidate pools of transforms associated to a lower temporal level.

Figure 7:
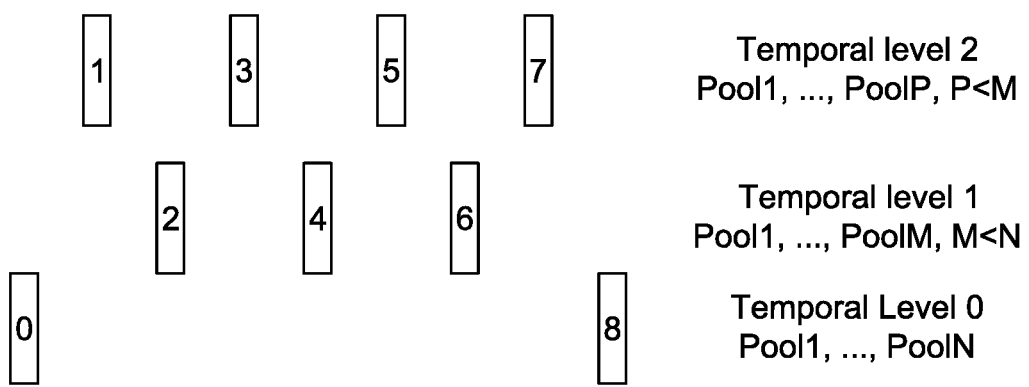
FIG. 7 shows a diagram of frames at staggered times as in one embodiment of the described methods.

The concept is illustrated in the FIG. 7, which shows the pictures for three temporal levels, and for each temporal level, a set of pools is enabled. In this example, the set of pools for temporal level 1 is a subset of the set of pools for temporal level 0, and the set of pools for temporal level 2 is a subset of the set of pools for temporal level 1.

In another embodiment, the pools themselves are temporal-level dependent. For instance, a pool is enabled for temporal level 0 (noted Pool0). For temporal level 1, a subset of this pool is enabled (noted Pool1). In Pool1, only some of the transforms from Pool0 are included. For temporal level 1, a subset of this pool is enabled (noted Pool2). In Pool2, only some of the transforms from Pool0 are included. Pool2 can be a subset of Pool1.

One advantage of the described embodiments over the prior art is an improvement in compression compared to the prior art with only one set of transforms.

Figure 8:
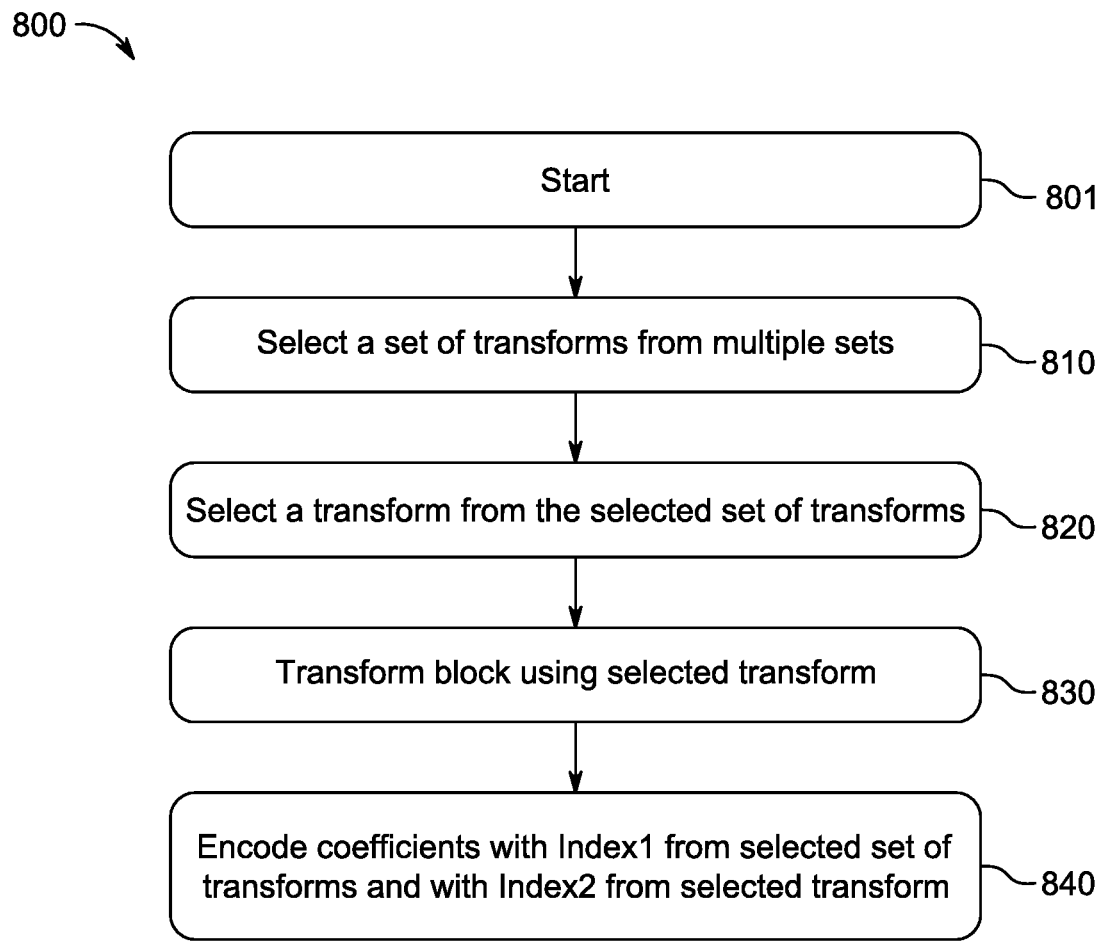
FIG. 8 shows one embodiment of a method for encoding a block in a video image using the general aspects described herein.

One embodiment of a method 800 for encoding a block in a video image is shown in FIG. 8. The method commences at Start block 801 and proceeds to block 810 for selecting a set of transforms from a plurality of sets of transforms, wherein the set of transforms is associated with a first index. The method proceeds from block 810 to block 820 for selecting a transform from among a plurality of transforms comprising the selected set of transforms from block 810, wherein the selected transform is associated with a second index. Control then proceeds from block 820 to block 830 for transforming at least a block in a region of the video image into transform coefficients using the selected transform. Control proceeds from block 830 to block 840 for encoding the transformed coefficients along with the first index and the second index into a bitstream.

Figure 9:
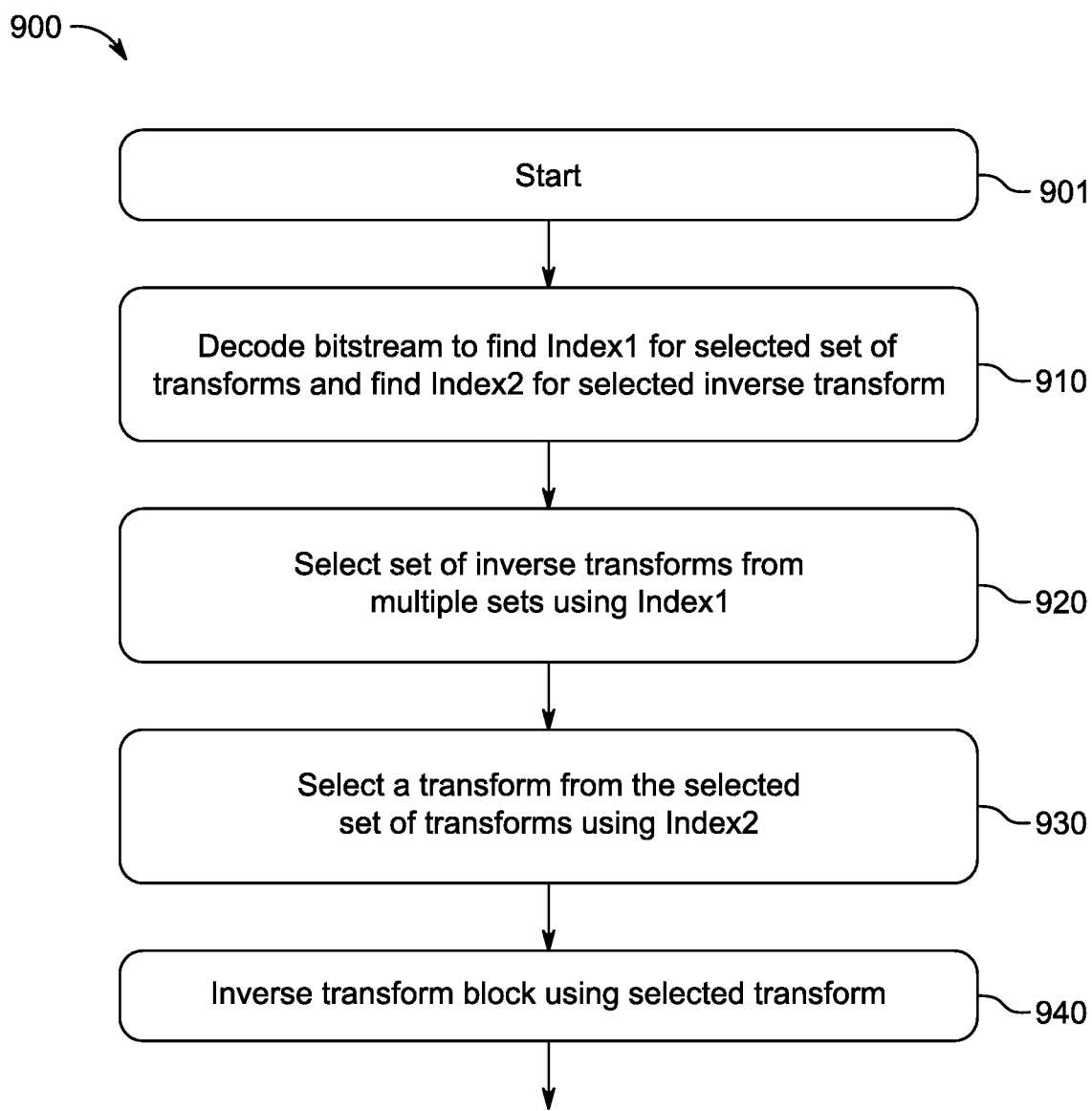
FIG. 9 shows one embodiment of a method for decoding a block in a video image using the general aspects described herein.

One embodiment of a method 900 for decoding a block in a video image is shown in FIG. 9. The method commences at Start block 901 and control proceeds to block 910 for decoding a video bitstream to generate a first index and a second index. Control proceeds from block 910 to block 920 for selecting a set of transforms associated with the first index from a plurality of sets of transforms to be used for decoding blocks within a region of a video image. Control proceeds from block 920 to block 930 for selecting a transform associated with the second index from among a plurality of transforms comprising the selected set of transforms, to use in decoding a block in the region of the video image. Control proceeds from block 930 to block 940 for inverse transforming coefficients of at least a block in the region of the video image using the selected transform.

Figure 10:
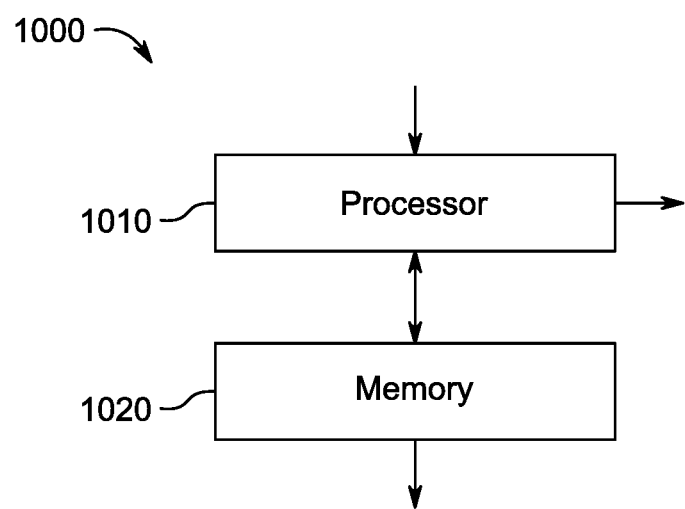
FIG. 10 shows one embodiment of an apparatus for encoding or decoding a block in a video image using the general aspects described herein.

One embodiment of an apparatus 1000 for encoding or decoding a block in a video image is shown in FIG. 10. The apparatus comprises a Processor 1010 and a Memory 1020. The Processor 1010 is configured, for encoding, to perform the steps of FIG. 8, that is selecting a set of transforms from among a plurality of sets of transforms to be used for encoding blocks within a region of a video image, wherein the selected set of transforms is associated with a first index; selecting a transform from among a plurality of transforms comprising the selected set of transforms associated with the first index to use for encoding a block, wherein the selected transform is associated with a second index; transforming at least a block in the region of the video image using the selected transform into transformed coefficients, and encoding the transformed coefficients along with the first index and the second index into a bitstream.

When Processor 1010 is configured for decoding, it performs the steps of FIG. 9, that is, decoding a video bitstream to generate a first index and a second index; selecting a set of transforms associated with the first index from among a plurality of sets of transforms to be used for decoding blocks within a region of a video image; selecting a transform associated with the second index from among a plurality of transforms comprising the selected set of transforms, associated with the first index, to use for decoding a block within the region of the video image, and inverse transforming coefficients of at least a block in the region of the video image using the selected transform.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

The present description illustrates the present principles. It will thus be appreciated that those skilled in the art will be able to devise various arrangements that, although not explicitly described or shown herein, embody the present principles and are included within its scope.

All examples and conditional language recited herein are intended for pedagogical purposes to aid the reader in understanding the present principles and the concepts contributed by the inventor(s) to furthering the art, and are to be construed as being without limitation to such specifically recited examples and conditions.

Moreover, all statements herein reciting principles, aspects, and embodiments of the present principles, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the present principles. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The present principles as defined by such claims reside in the fact that the functionalities provided by the various recited means are combined and brought together in the manner which the claims call for. It is thus regarded that any means that can provide those functionalities are equivalent to those shown herein.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

In conclusion, improved methods and apparatus for improving the performance of video encoders and decoders involves selecting a set of transforms from among a plurality of sets of transforms that can be used for coding blocks in a region of a video image. Within a region, selection of a particular transform from among a plurality of transforms comprising the selected set of transforms is used to encoder or decode at least one block in the region. Associated indices representing the set of transforms to be used within a region and the selected transform for a block can be sent in a bitstream. In an alternate embodiment, a default set of transforms is complemented by selection of an additional set of transforms on a block or region basis.

The invention claimed is:

1. A method, comprising:
selecting a set of transforms from among a plurality of sets of transforms to be used for encoding blocks within a region of a video picture of a video sequence, wherein multiple respective sets of transforms are considered for selection for each temporal level in the video sequence, and wherein the plurality of sets of transforms, which are associated with a first temporal layer, are a subset of the plurality of sets of transforms which are associated with a second, lower temporal layer;
selecting a transform from among a plurality of transforms comprising the selected set of transforms to use for encoding a block;
transforming at least the block in the region of the video picture using the selected transform into transformed coefficients; and
encoding the transformed coefficients along with a first index associated with the selected set of transforms and a second index associated with the selected transform into a bitstream, wherein the first index is signaled at a picture level of a video coding hierarchy and the second index is signaled at a Transform Unit (TU) level of the video coding hierarchy.

2. A method, comprising:
decoding a first index and a second index from a video bitstream, wherein the first index is signaled at a picture level of a video coding hierarchy and the second index is signaled at a Transform Unit (TU) level of the video coding hierarchy;
selecting a set of transforms associated with the first index from among a plurality of sets of transforms to be used for decoding blocks within a region of a video picture of a video sequence, wherein multiple respective sets of transforms are considered for selection for each temporal level in the video sequence, and wherein the plurality of sets of transforms, which are associated with a first temporal layer, are a subset of the plurality of sets of transforms which are associated with a second, lower temporal layer;
selecting a transform associated with the second index from among a plurality of transforms comprising the selected set of transforms, associated with the first index, to use for decoding a block within the region of the video picture; and
inverse transforming coefficients of at least the block in the region of the video picture using the selected transform.

3. An apparatus, comprising:
a memory, and
a processor, configured to:
select a set of transforms from among a plurality of sets of transforms to be used for encoding blocks within a region of a video picture of a video sequence, wherein multiple respective sets of transforms are considered for selection for each temporal level in the video sequence, and wherein the plurality of sets of transforms, which are associated with a first temporal layer, are a subset of the plurality of sets of transforms which are associated with a second, lower temporal layer, select a transform from among a plurality of transforms comprising the selected set of transforms associated with the first index to use for encoding a block, transform at least the block in the region of the video picture using the selected transform into transformed coefficients, and encode the transformed coefficients along with a first index associated with the selected set of transforms and a second index associated with the selected transform into a bitstream, wherein the first index is signaled at a picture level of a video coding hierarchy and the second index is signaled at a Transform Unit (TU) level of the video coding hierarchy.

4. An apparatus, comprising:

a memory, and a processor, configured to:

decode a first index and a second index from a video bitstream, wherein the first index is signaled at a picture level of a video coding hierarchy and the second index is signaled at a Transform Unit (TU) level of the video coding hierarchy, select a set of transforms associated with the first index from among a plurality of sets of transforms to be used for decoding blocks within a region of a video picture of a video sequence, wherein multiple respective sets of transforms are considered for selection for each temporal level in the video sequence, and wherein the plurality of sets of transforms, which are associated with a first temporal layer, are a subset of the plurality of sets of transforms which are associated with a second, lower temporal layer;

select a transform associated with the second index from among a plurality of transforms comprising the selected set of transforms, associated with the first index, to use for decoding a block within the region of the video picture, and inverse transform coefficients of at least the block in the region of the video picture using the selected transform.

5. The method of claim 1, wherein the TU level is lower than the picture level.

6. The method of claim 1, further comprising:

adding the selected set of transforms to a default set of transforms before selecting the transform from among the selected set of transforms associated with the first index and the default set of transforms to use for encoding the block.

7. The method of claim 1, wherein the selected set of transforms provide a minimum rate-distortion cost for the region of the video picture.

8. The method of claim 1, wherein the plurality of sets of transforms comprise systematic transforms.

9. A non-transitory computer readable medium comprising instructions which, when the program is executed by a computer, causes the computer to carry out the method of claim 1.

10. A non-transitory computer readable medium comprising instructions which, when the program is executed by a computer, causes the computer to carry out the method of claim 2.

11. The method of claim 2, wherein the TU level is lower than the picture level.

12. The method of claim 2, wherein the selected set of transforms provide a minimum rate-distortion cost for the region of the video picture.

13. The method of claim 2, wherein the plurality of sets of transforms comprise systematic transforms.

14. The apparatus of claim 3, wherein the TU level is lower than the picture level.

15. The apparatus of claim 3, wherein the processor is further configured to:

add the selected set of transforms to a default set of transforms before selecting the transform from among the selected set of transforms associated with the first index and the default set of transforms to use for encoding the block.

16. The apparatus of claim 3, wherein the selected set of transforms provide a minimum rate-distortion cost for the region of the video picture.

17. The apparatus of claim 3, wherein the plurality of sets of transforms comprise systematic transforms.

18. The apparatus of claim 4, wherein the TU level is lower than the picture level.

19. The apparatus of claim 4, wherein the selected set of transforms provide a minimum rate-distortion cost for the region of the video picture.

20. The apparatus of claim 4, wherein the plurality of sets of transforms comprise systematic transforms.

* * * * *